United States Patent
Takada et al.

(10) Patent No.: US 6,351,532 B1
(45) Date of Patent: *Feb. 26, 2002

(54) ECHO CANCELER EMPLOYING MULTIPLE STEP GAINS

(75) Inventors: Masashi Takada; Yoshihiro Ariyama, both of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/758,363

(22) Filed: Jan. 12, 2001

Related U.S. Application Data (63) Continuation of application No. 09/056,000, filed on Apr. 7, 1998.

(30) Foreign Application Priority Data

Jun. 11, 1997 (JP) ............................................. 9-153428

(51) Int. Cl.[7] .............................................. H04M 1/00
(52) U.S. Cl. ............................ 379/406.01; 379/390.01
(58) Field of Search ........................ 379/402, 406–407, 379/409–411, 416–417, 390–392; 370/286–291; 375/345–346; 381/94.1–94.3

(56) References Cited

U.S. PATENT DOCUMENTS

| | | | | |
|---|---|---|---|---|
| 4,605,826 A | * | 8/1986 | Kanemassa ................. | 379/411 |
| 4,628,529 A | | 12/1986 | Borth et al. ................ | 381/94.3 |
| 5,267,322 A | * | 11/1993 | Smith et al. ................ | 375/345 |
| 5,406,635 A | * | 4/1995 | Jarvinen .................... | 381/94.3 |
| 5,455,819 A | | 10/1995 | Sugiyama ................... | 370/290 |
| 5,570,423 A | * | 10/1996 | Walker et al. .............. | 379/410 |
| 5,727,072 A | * | 3/1998 | Raman ...................... | 381/94.2 |
| 5,748,725 A | * | 5/1998 | Kubo ........................ | 379/406 |
| 5,764,753 A | * | 6/1998 | McCaslin et al. .......... | 379/389 |
| 5,937,060 A | * | 8/1999 | Oh ............................ | 379/410 |
| 6,185,301 B1 | * | 2/2001 | Muraoka .................... | 379/410 |

FOREIGN PATENT DOCUMENTS

EP 0 710 947 5/1996

OTHER PUBLICATIONS

Fujii et al., "A Method of Continuing to Adjust Adaptive Filter Coefficients in Voiceless Noise Terms Available for Acoustic Echo Canceller Systems", Transactions of The Institute of Electronics, Information, and Communication Engineers, vol. J78–A, No. 11, Nov. 1995, pp. 1403–1409.

* cited by examiner

Primary Examiner—Curtis Kuntz
Assistant Examiner—George Eng
(74) Attorney, Agent, or Firm—Venable; Robert J. Frank; Micheal A. Sartori (57) ABSTRACT

According to a first aspect of the invention, in an echo canceler having an adaptive filter, the tap coefficients of the adaptive filter are partitioned into at least two segments, and different step gains are assigned to different segments. The step gains are used in adjusting the tap coefficients, and determine the sensitivity of the adjustment to noise in the residual signal left after echo cancellation. Comparatively small step gains are assigned to noise-sensitive segments. According to a second aspect of the invention, the step gain is switched according to the level of local background noise.

5 Claims, 4 Drawing Sheets

ECHO CANCELER EMPLOYING MULTIPLE STEP GAINS

This appln is a continuation of Ser. No. 09/056,000 filed Apr. 7, 1998.

BACKGROUND OF THE INVENTION

The present invention relates to an echo canceler for removing echo from an input signal in which local background noise is also present.

Echo cancelers are used in videoconferencing terminals, mobile telephone sets, and the like, to prevent the party at the far end from being distracted by hearing an echo of his or her own voice. The echo canceler has an adaptive filter that operates on the signal received from the far end to predict the echo that this signal will produce. The predicted echo is subtracted from the local input signal to remove the echo from the signal sent back to the far end.

To adapt to changes in the local echo path, the tap coefficients of the adaptive filter are adjusted by a mathematical algorithm, such as the well-known normalized least mean squares (NLMS) algorithm, that forces the coefficients to converge to values matching the impulse response of the echo path. The best time to adjust the tap coefficients is when the party at the far end is speaking and the party at the near end is not speaking. Most echo cancelers confine tap-coefficient adjustments to this so-called single-talk state, which can be detected by monitoring the power of the signals involved.

Even when the party at the near end is not speaking, however, local background noise may be present. The residual echo of the far-end speaker's voice cannot easily be separated from the local background noise, so at moderate or high levels of the local background noise, the tap coefficients cannot be adjusted accurately.

One proposed solution to this problem is the summational NLMS algorithm, which replaces the numerator and denominator values in the NLMS algorithm with sums of these values over an interval of time. The length of the summing interval increases as the power of the outgoing signal decreases. The theory is that over the summing interval, the local background noise will average out to substantially zero, making accurate adjustment of the tap coefficients possible despite the local background noise.

In many situations, however, the local background noise has components that do not average out to zero. Examples of such components include engine noise in an automobile, ventilator noise inside buildings, and crowd noise in the outdoor environments in which portable telephone sets are often used. The summational NLMS algorithm fails to protect the adaptive filter from the effects of this type of local background noise. The summational NLMS algorithm works well only when the local background noise has certain statistical characteristics, such as the characteristics of white noise.

To complicate the problem, the echo canceler may be combined with a noise canceler that removes at least some of the local background noise components from the outgoing signal. This makes the residual echo easier to detect, but the noise canceler's internal characteristics can affect the adjustment of the echo canceler's tap coefficients, and in any case, cancellation of the local background noise is rarely complete.

SUMMARY OF THE INVENTION

It is accordingly an object of the present invention to improve echo cancellation by reducing the effects of local background noise on the adjustment of tap coefficients in an echo canceler.

A further object is to improve echo cancellation when local background noise is also canceled.

The invented echo cancellation method employs an adaptive filter, and adjusts the tap coefficients of the adaptive filter according to a residual signal left after echo cancellation, using an algorithm in which a step gain determines the sensitivity of the adjustment to the residual signal. According to a first aspect of the invention, the echo cancellation method comprises the steps of:

partitioning the tap coefficients into at least two segments, which are affected to different degrees by local background noise; and assigning different step gains to the different segments.

A preferred method of partitioning the tap coefficients calculates smoothed absolute values of the tap coefficients, calculates the noise power of the residual signal, and compares the smoothed absolute values of the tap coefficients with the noise power.

An echo canceler according to the first aspect of the invention comprises a partitioner for partitioning the tap coefficients, and a step gain generator for assigning step gains.

An echo cancellation method according to a second aspect of the invention comprises at least the first two, and preferably all four, of the following steps:

classifying the local background noise level;

selecting different step gains according to the class of the local background noise level;

canceling local background noise from the residual signal; and choosing between the residual signal before noise cancellation and the residual signal after noise cancellation for use in adjustment of the tap coefficients, according to the local background noise level.

These steps can also be incorporated into the first aspect of the invention.

An echo canceler according to the second aspect of the invention comprises a noise level classifier for classifying the local background noise level, and a step gain generator for selecting step gains. The echo canceler may be combined with a noise canceler that cancels noise in the residual signal; in that case, the noise level classifier chooses between the input and output of the noise canceler for use in adjusting the tap coefficients.

DETAILED DESCRIPTION OF THE INVENTION

Embodiments of the present invention will be described with reference to the attached exemplary drawings.

Figure 1:
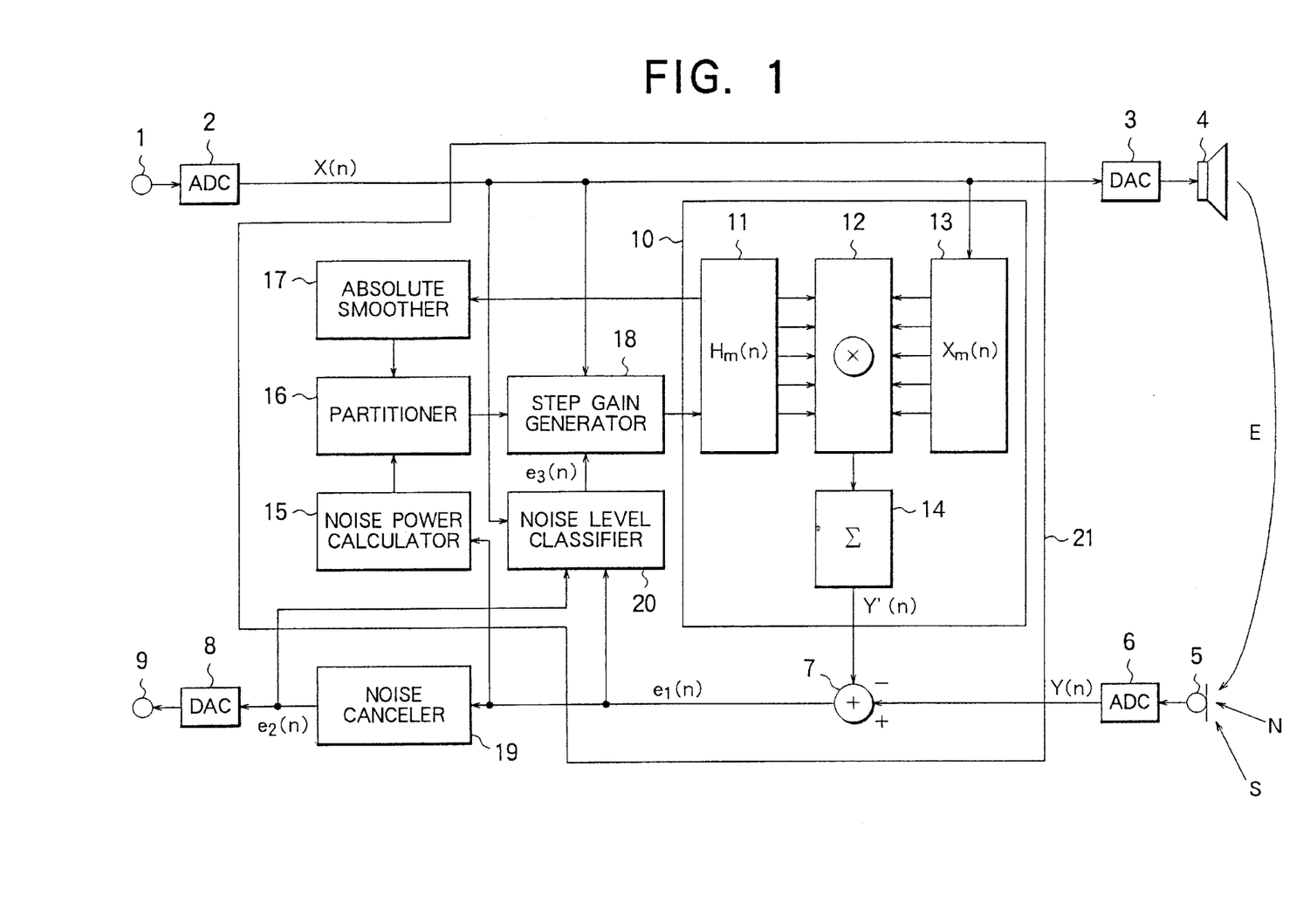
FIG. 1 is a block diagram of a first embodiment of the invention.

Referring to FIG. 1, the first embodiment operates in a communication device, such as a videoconferencing device or mobile telephone set, having an input terminal 1 for receiving a signal transmitted from a distant communication terminal, an analog-to-digital converter (ADC) 2 for converting the received signal to a digital signal $X(n)$, a digital-to-analog converter (DAC) 3 for converting $X(n)$ back to an analog signal, and a loudspeaker 4 through which the analog signal output by the DAC 3 is reproduced as an acoustic signal. A microphone 5 picks up part of the reproduced acoustic signal as an acoustic echo signal E. The microphone 5 also picks up a local background noise signal N and, when the local party is speaking, a local speech signal S. The microphone 5 converts these local acoustic input signals E, S, and N to an analog electrical signal, which is converted by an ADC 6 to a digital signal, denoted $Y(n)$. An adder 7 adds the two's complement of an echo replica signal $Y'(n)$, thereby subtracting $Y'(n)$ from $Y(n)$, to create a first residual signal $e_1(n)$. Noise cancellation (described below) creates a second residual signal $e_2(n)$ from the first residual signal $e_1(n)$. A selected one of the two residual signals $e_1(n)$ and $e_2(n)$ is converted to an analog signal by a DAC 8 and provided to an output terminal 9 for transmission to the distant communication terminal, referred to below as the far end.

The letter 'n' above is a discrete time variable, designating a particular sample of the digital signals.

The echo replica signal $Y'(n)$ is generated by an adaptive filter 10 comprising a tap coefficient register 11, a multiplier 12, a sample register 13, and an accumulator 14. The tap coefficient register 11 stores tap coefficients, which the multiplier 12 multiplies by a sequence of samples representing the most recent samples of the far-end signal $X(n)$, which are stored in the sample register 13. The accumulator 14 sums the results to obtain the echo replica signal $Y'(n)$.

The tap coefficients are adjusted by means of a noise power calculator 15, a partitioner 16, an absolute smoother 17, and a step gain generator 18. By comparing the outputs of the noise power calculator 15 and absolute smoother 17, the partitioner 16 divides the tap coefficients into two segments. The step gain generator 18 generates separate step gains for the two segments, and uses these step gains to adjust the tap coefficients in each segment according to the NLMS algorithm.

A noise canceler 19 is inserted between the adder 7 and DAC 8, to estimate signal components due to the local background noise N, and remove these noise components from the outgoing signal. The input signal of the noise canceler 19 is the first residual signal $e_1(n)$. The output signal of the noise canceler 19 is the second residual signal $e_2(n)$. The noise canceler 19 can employ any of various well-known noise cancellation methods, such as spectral subtraction, bandsplitting attenuation, or adaptive filtering, descriptions of which will be omitted.

The two residual signals $e_1(n)$ and $e_2(n)$ are supplied to a noise level classifier 20, which selects one or both of the two residual signals for use in adjusting the tap coefficients. The residual signal used in adjusting the tap coefficients, denoted $e_3(n)$ in the drawing, is supplied to the step gain generator 18. Although not explicitly shown in the diagram, the noise level classifier 20 also selects which of the two residual signals $e_1(n)$ and $e_2(n)$ is sent to the DAC 8. The residual signal sent to the DAC 8 is not necessarily the same as the residual signal $e_3(n)$ supplied to the step gain generator 18.

The adder 7, adaptive filter 10, noise power calculator 15, partitioner 16, absolute smoother 17, step gain generator 18, and noise level classifier 20 constitute the echo canceler 21. Of these elements, the adder 7 and adaptive filter 10 operate at all times. A double-talk detector (not shown) disables the noise power calculator 15, partitioner 16, absolute smoother 17, step gain generator 18, and noise level classifier 20 while the local party is speaking, so that the tap coefficients are not adjusted during these times. The double-talk detector also halts adjustment of the tap coefficients when the speaker at the far end is completely silent.

The operation of the individual noise canceler elements will now be described in more detail.

The tap coefficients stored in the tap coefficient register 11 at time n will be denoted $H_m(n)$. The number of tap coefficients will be denoted by the letter I, so the subscript m varies from one to I.

The sample values stored in the sample register 13 at time n will be denoted $X_m(n)$, where m again varies from one to I. $X_1(n)$ is the most recent sample, equal to $X(n)$ itself. $X_2(n)$ is the next most recent sample, equal to $X(n-1)$, and so on.

The operations performed by the multiplier 12 and accumulator 14 can be expressed mathematically as follows.

$$Y'(n) = \sum_{m=1}^{I} H_m(n) X_m(n)$$

The noise power calculator 15 calculates the power Np of the first residual signal $e_1(n)$. Np is referred to as a noise power value because, when local speech S is absent, $e_1(n)$ consists of local background noise and residual echo, which is also a type of noise. Np is calculated as a weighted average of the absolute value of $e_1(n)$ over an interval of samples, referred to as a frame. The noise power calculation can be carried out by an iterative smoothing operation described by the equation below, in which $a_1$ is a smoothing factor disposed strictly between zero and one ($0 < a_1 < 1$). A typical value of $a_1$ is 0.5, although the first embodiment is not limited to this value.

$$Np(j) = a_1 Np(j-1) + ABS(e_1(j))(1-a_1)$$

In this equation, ABS denotes the absolute value, and j is the sample number in the frame. The oldest sample in the frame is $e_1(1)$. The most recent sample is $e_1(J)$, where J is the number of samples per frame. The initial power value Np(0) is zero. The final power value Np(J) is the noise power value Np determined by the noise power calculator 15.

The first embodiment is not limited to this method of calculating Np. An alternative method is to take the simple arithmetic average of the absolute values of the J sample values $e_1(j)$ in the frame.

At the end of the frame, the noise power calculator 15 compares the calculated noise power value Np(J) with a predetermined threshold value, and supplies Np(J) to the partitioner 16 if Np(J) exceeds the threshold.

When the noise power calculator 15 supplies Np(J) to the partitioner 16, the absolute smoother 17 supplies the partitioner 16 with a set of smoothed absolute values calculated from the tap coefficients stored in the tap coefficient register 11. The absolute smoother 17 performs, for example, the following iterative calculation, in which $\delta$ is a smoothing factor ($0<\delta<1$). A typical value of $\delta$ is 0.5, although the first embodiment is not limited to this value. The value of m is an integer from 1 to I, where I is the number of tap coefficients.

$$ah_1(m) = ABS(H_m(n))$$

$$avah_1(m) = \delta ah_1(m) + (1-\delta) avah_1(m-1)$$

In these equations, $ah_1(m)$ is the absolute value of the m-th tap coefficient $H_m(n)$, and $avah_1(m)$ is a weighted average of the first m tap coefficients. The initial weighted average value $avah_1(0)$ is equal to zero. The absolute smoother 17 supplies the partitioner 16 with a complete set of weighted average values from $avah_1(1)$ to $avah_1(I)$.

The first embodiment is not limited to this method of calculating $avah_1(m)$. An alternative method is to calculate $avah_1(m)$ as the simple arithmetic average of the absolute values from $ah_1(1)$ to $ah_1(m)$.

Figure 2:
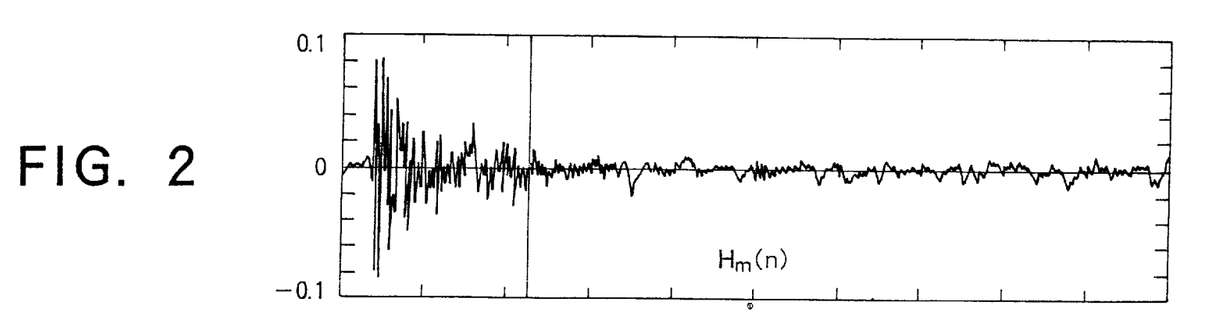
FIG. 2 is a graph showing an example of tap coefficients in the first embodiment.
Figure 3:
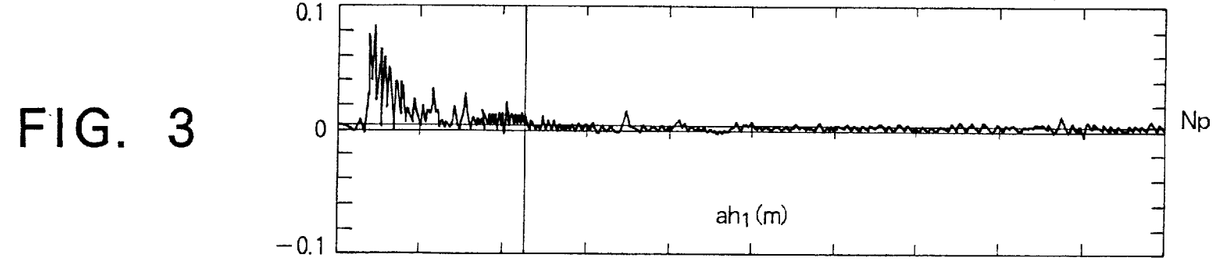
FIG. 3 is a graph showing the absolute values of the tap coefficients in FIG. 2.
Figure 4:
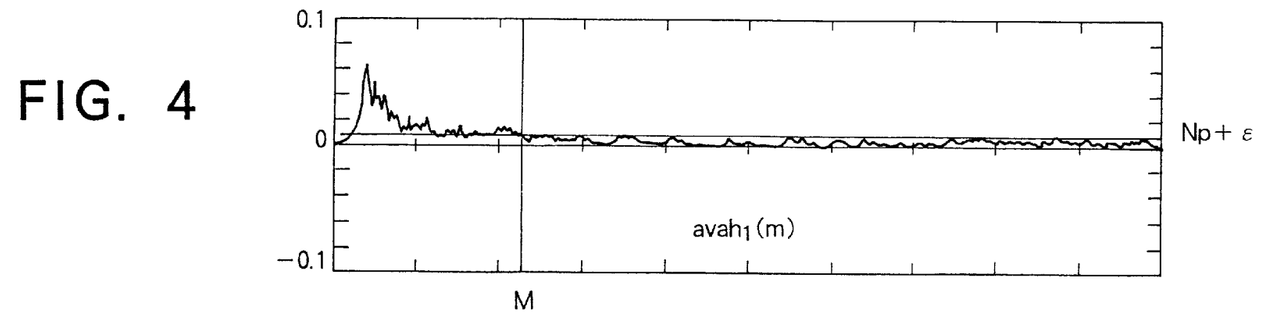
FIG. 4 is a graph showing smoothed absolute values of the tap coefficients in FIG. 2.

FIG. 2 shows a typical example of the tap coefficients $H_m(n)$ at a time n. FIG. 3 shows the corresponding absolute values $ah_1(m)$. FIG. 4 shows the weighted average values $avah_1(m)$. In each of these drawings, the horizontal axis represents the tap number (m), and the vertical axis represents the corresponding value of $H_m(n)$, $ah_1(m)$, or $avah_1(m)$. The calculation performed by the absolute smoother 17 can be seen to preserve the general trend of the absolute values of the tap coefficients, while smoothing out abrupt changes in these values.

The partitioner 16 adds an offset $\epsilon$ to the noise power value Np(J) and compares the result with the smoothed absolute values $avah_1(m)$, in descending order of the tap number m, starting from the I-th smoothed absolute value $avah_1(I)$. The tap number of the first smoothed tap coefficient that exceeds the sum of the noise power value Np(J) and offset $\epsilon$ is set as a boundary tap number M. The partitioner 16 accordingly finds the maximum value of m for which the following inequality is satisfied.

$$Np(J) + \epsilon < avah_1(m)$$

This boundary tap number M divides the tap coefficients into a first segment, from $H_1(n)$ to $H_M(n)$, and a second segment, from $H_{M+1}(n)$ to $H_I(n)$.

Examples of the values of Np(J) and Np(J)+$\epsilon$ are indicated as Np and Np+$\epsilon$ in FIGS. 3 and 4, respectively.

In adjusting the tap coefficients, the step gain generator 18 uses the sample values of the far-end signal $X_m(n)$ stored in the sample register 13, the residual signal $e_3(n)$ supplied by the noise level classifier 20, the boundary value M supplied by the partitioner 16, and two step gain values $\alpha_1$ and $\alpha_2$. Both step gain values are disposed in the interval from zero to one: for example, $\alpha_1$ can be equal to 0.7, and $\alpha_2$ to 0.125. The first embodiment is not limited to these particular values, but the first step gain $\alpha_1$ must be greater than the second step gain $\alpha_2$. The first step gain $\alpha_1$ is used only in the first segment of tap coefficients. The second step gain $\alpha_2$ can be used in the second segment of tap coefficients, or in both segments.

The adjustment is performed by the NLMS algorithm, as described in the equations below. $H_m(n)$ denotes the value of the m-th tap coefficient $H_m(n)$ at time n, and $H_m(n+1)$ denotes the adjusted value of the same tap coefficient $H_m(n)$ at time n+1. The symbol $\Sigma$ denotes summation over values of an index integer i from 1 to I.

When the noise level classifier 20 selects the first residual signal $e_1(n)$ for use as $e_3(n)$, the adjustment is performed according to the following equation, using the first step gain $\alpha_1$ in the first segment of tap coefficients, and the second step gain $\alpha_2$ in the second segment;

$$H_m(n+1) = H_m(n) + \alpha X_m(n) e_3(n) / (\Sigma X_i(n) X_i(n))$$

$$\alpha = \alpha_1 \text{ when } 1 \leq m \leq M$$

$$\alpha = \alpha_2 \text{ when } M+1 \leq m \leq I$$

When the noise level classifier 20 selects the second residual signal $e_2(n)$ for use as $e_3(n)$, the adjustment is performed according to the following equation, in which d is a quantity that corresponds to the processing delay of the noise canceler 19. The second step gain $\alpha_2$ is used unconditionally.

$$H_m(n+1) = H_m(n) + \alpha_2 X_m(n-d) e_3(n) / (\Sigma X_i(n-d) X_i(n-d))$$

The noise level classifier 20 classifies the local background noise on the basis of a pair of ratios, denoted NCANC and ACOM below. NCANC is a noise canceling ratio, equal to the magnitude ratio between the input $e_1(n)$ and output $e_2(n)$ of the noise canceler 19. ACOM is an acoustic echo attenuation ratio, equal to the magnitude ratio between the received signal X(n) and the output $e_2(n)$ of the noise canceler 19. The noise level classifier 20 compares NCANC with a predetermined threshold value $\zeta$, and compares ACOM with another predetermined threshold value $\lambda$.

When NCANC is less than $\zeta$ (NCANC<$\zeta$) and ACOM is equal to or greater than $\lambda$ (ACOM$\geq\lambda$), the noise level classifier 20 classifies the local background noise level as low, and selects the first residual signal $e_1(n)$ for input to both the DAC 8 and the step gain generator 18. The first residual signal $e_1(n)$ is used as $e_3(n)$ for adjusting all of the tap coefficients, and also becomes the signal transmitted from the output terminal 9, after digital-to-analog conversion by the DAC 8.

When ACOM is less than $\lambda$ (ACOM<$\lambda$), the noise level classifier 20 classifies the local background noise level as high, and selects the second residual signal $e_2(n)$ for input to both the DAC 8 and the step gain generator 18. The second residual signal $e_2(n)$ is used as $e_3(n)$ for adjusting all of the tap coefficients, and also becomes the signal transmitted from the output terminal 9, after digital-to-analog conversion by the DAC 8. This selection is made regardless of the value of NCANC.

When NCANC is equal to or greater than $\zeta$ (NCANC$\geq\zeta$) and ACOM is equal to or greater than $\lambda$ (ACOM$\geq\lambda$), the noise level classifier 20 classifies the local background noise level as intermediate, selects the second residual signal $e_2(n)$ for input to the DAC 8, and selects both residual signals for input to the step gain generator 18. The first residual signal $e_1(n)$ is used as $e_3(n)$ for adjusting the first segment of tap coefficients. The second residual signal $e_2(n)$ is used as $e_3(n)$ for adjusting the second segment of tap coefficients.

The echo canceler 21 can be implemented in hardware, as an application-specific integrated circuit, for example. The echo canceler 21 can also be implemented in software, by programming a general-purpose processor such as a digital signal processor to carry out the functions of the elements shown in FIG. 1.

Next, the overall operation of the echo canceler 21 will be described for various cases of far-end and near-end speech and local background noise.

When the party at the far end is speaking, the party at the near end is not speaking, and little local background noise is present, the echo canceler 21 is able to adjust the tap coefficients on the basis of a strong acoustic echo with comparatively little local interference, leading to accurate echo cancellation, so the condition ACOM$\geq\lambda$ will be satisfied. Since there is not much local background noise for the noise canceler 19 to remove, the condition NCANC$<\zeta$ will also be satisfied, and the noise level classifier 20 will classify the local background noise level as low. The noise canceler 19 is accordingly removed from the transmission path, and the first residual signal $e_1(n)$ is used for updating all of the tap coefficients. Echo cancellation is not affected by the internal characteristics of the noise canceler 19.

The first M tap coefficients, constituting the first segment, are adjusted with the first step gain $\alpha_1$. As shown in FIG. 3, most of these coefficients are larger in magnitude than the noise power value Np, so local background noise has a comparatively small effect on the adjustments made to these coefficients. Use of the comparatively large step gain $\alpha_1$ allows the NLMS algorithm to converge quickly to the desired values of these tap coefficients, enabling rapid adjustment to changes in the echo path.

The (M+1)-th to I-th tap coefficients, constituting the second segment, are adjusted with the second step gain $\alpha_2$. These tap coefficients are more sensitive to noise effects, because their magnitude is generally comparable to, or less than, the noise level. Use of the comparatively small step gain $\alpha_2$ prevents large, erratic adjustments from being made to these tap coefficients due to local background noise.

The boundary M between the tap coefficients that are sensitive to local background noise and the tap coefficients that are not sensitive to such noise may change, due to a change in the echo path, or due to an increase in the amount of local background noise. In either case, the result is an increase in the noise power Np calculated by the noise power calculator 15. When the noise power Np exceeds the relevant threshold level, the partitioner 16 recomputes the boundary M, by comparing Np plus the offset $\epsilon$ with the smoothed tap coefficient values output by the absolute smoother 17. Adding the offset $\epsilon$ to the noise power value Np prevents the echo canceler 21 from being overly sensitive to fluctuations in the noise level.

If the local background noise level increases to the point where there is significant noise for the noise canceler 19 to remove, without increasing so far as to interfere drastically with echo cancellation, the conditions NCANC$\geq\zeta$ and ACOM$\geq\lambda$ will be satisfied, causing the noise level classifier 20 to classify the local background noise level as intermediate. The second residual signal $e_2(n)$, in which the local background noise is reduced, is now sent to the far end. The tap coefficients in the second segment, which are more sensitive to noise, are now adjusted on the basis of the second residual signal $e_2(n)$, with the processing delay d of the noise canceler 19 included in the adjustment. Use of the second residual signal $e_2(n)$ and the comparatively small second step gain $\alpha_2$ keeps large, erratic adjustments from being made.

The tap coefficients in the first segment, which are less sensitive to noise, continue to be adjusted on the basis of the first residual signal $e_1(n)$, using the comparatively large first step gain $\alpha_1$. Adjustments to changes in the echo path can therefore still be made comparatively rapidly. Since the first residual signal $e_1(n)$ contains the true residual echo, unmodified by the noise canceler 19, the adjustments can also be made accurately.

When the noise level classifier 20 detects an intermediate local background noise level, the noise power Np detected by the noise power calculator 15 will exceed the threshold value for recomputing the boundary value M relatively frequently, and the partitioner 16 will keep the boundary positioned so that tap coefficients sensitive to local background noise are correctly placed in the second segment.

If the local background noise level becomes very high, or if the party at the far end stops speaking, it may become difficult to detect much echo cancellation, causing the echo attenuation ratio ACOM to fall below the threshold value $\lambda$, and the noise level classifier 20 to classify the local background noise level as high. This high classification means that the local background noise level is high in relation to the signal received from the far end. If the party at the far end is speaking, all tap coefficients are adjusted on the basis of the second residual signal $e_2(n)$, using the second step gain $\alpha_2$ and delay d, and $e_2(n)$ is sent to the far end.

The low echo attenuation ratio ACOM indicates that in the first residual signal $e_1(n)$, the residual echo is being disguised by local background noise, which is likely to prevent accurate adjustment of the tap coefficients. Beneficial adjustments may still be made using the second residual signal $e_2(n)$, however, in which the noise level is reduced. The comparatively small second step gain $\alpha_2$ prevents the echo canceler 21 from being too strongly affected by the local background noise.

If the party at the far end is not speaking, the double-talk detector halts tap adjustment, as mentioned above.

When the party at the near end is speaking, since the noise canceler 19 must not remove the near-end speech component (S), the tap coefficients cannot be adjusted correctly, even using the second residual signal $e_2(n)$. The double-talk detector also prevents adjustment of the tap coefficients at these times. Echo cancellation continues, however, using the existing values of the tap coefficients.

In the first embodiment, sensitive tap coefficients are protected from noise effects by use of a comparatively small step gain, and by use of the residual signal output from the noise canceler 19 when the local background noise level is classified as intermediate or high. At the same time, tap coefficients which are not sensitive to noise are permitted to converge quickly, by use of a comparatively large step gain and use of the residual signal input to the noise canceler 19, unless the local background noise level is classified as high. At high levels of local background noise, the first embodiment adjusts the tap coefficients conservatively, using a small step gain and the residual signal output by the noise canceler 19 for all tap coefficients.

As a result, when local background noise is present, the first embodiment can improve significantly on the performance of an echo canceler employing a single step gain for all tap coefficients. Moreover, unlike an echo canceler employing the summational NLMS algorithm, the first embodiment does not require the local background noise to have any particular statistical characteristics. A performance improvement is obtainable for all types of local background noise.

Next, a second embodiment will be described.

Figure 5:
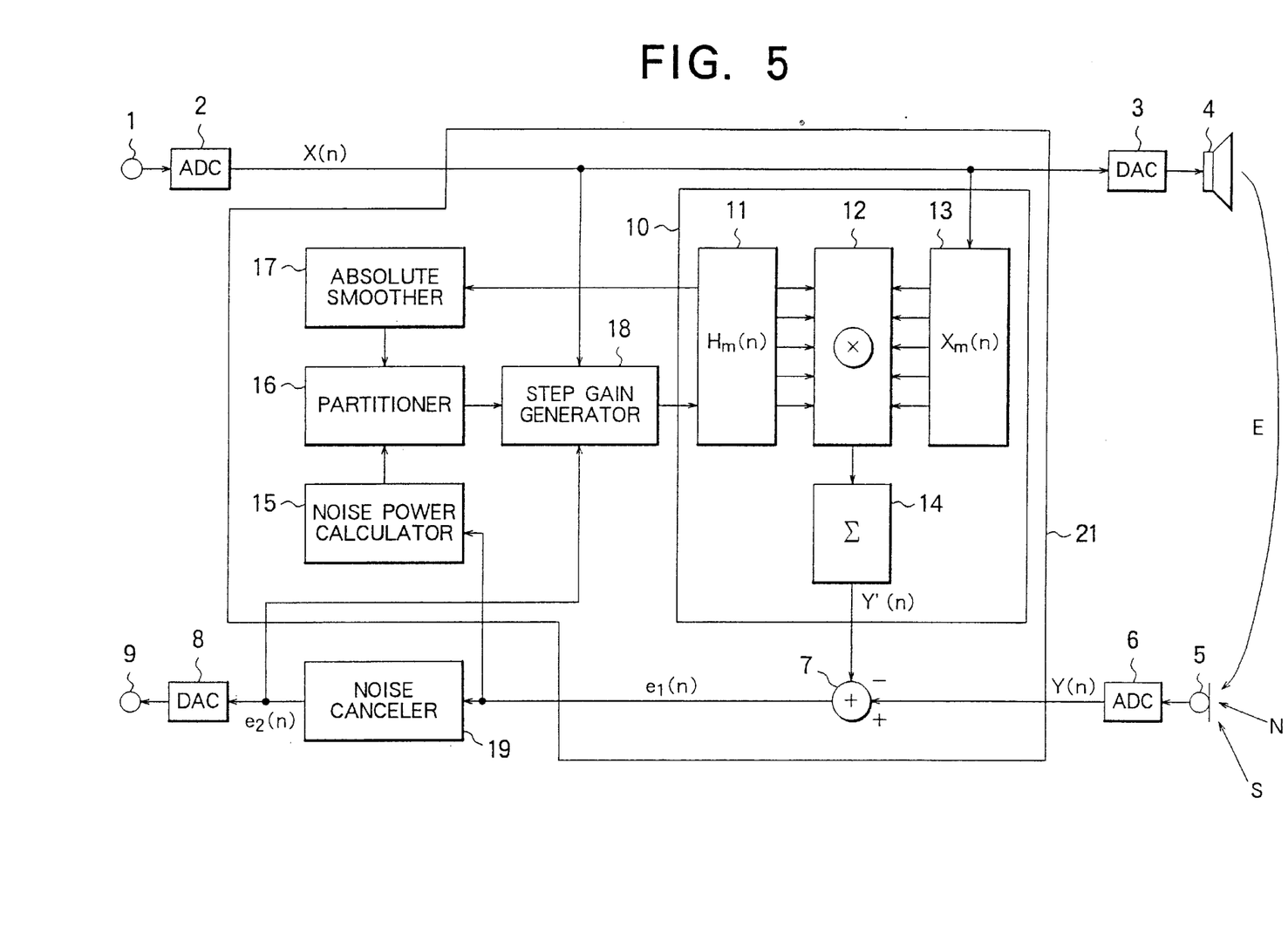
FIG. 5 is a block diagram of a second embodiment of the invention.

FIG. 5 shows the second embodiment, using the same reference numerals as in FIG. 1 for equivalent elements. The second embodiment differs from the first embodiment in having no noise level classifier. The second residual signal $e_2(n)$ is always supplied to the DAC 8 and step gain generator 18, and is used for all tap-coefficient adjustments.

The adaptive filter 10, noise power calculator 15, partitioner 16, and absolute smoother 17 operate as in the first embodiment. The step gain generator 18 adjusts the tap coefficients according to the following equation, using the comparatively large first step gain $\alpha_1$ for the first segment of tap coefficients, using the comparatively small second step gain $\alpha_2$ for the second segment of tap coefficients, and always using the quantity d to compensate for the processing delay of the noise canceler 19.

$$H_m(n+1)=H_m(n)+\alpha_2 X_m(n-d)e_2(n)/(\Sigma X_i(n-d)X_i(n-d))$$

$\alpha=\alpha_1$ when $1 \leq m \leq M$ $\alpha=\alpha_2$ when $M+1 \leq m \leq I$ Like the first embodiment, the second embodiment protects sensitive tap coefficients from local background noise effects, by employing different step gains for the two segments, without relying on statistical properties of the local background noise.

When implemented in hardware, the second embodiment is simpler than the first embodiment, due to the elimination of the noise level classifier. When implemented in software, the second embodiment can operate faster than the first embodiment, due to the elimination of computation required to calculate ACOM and NCANC. Further simplification and speed-up results from the elimination of the need to store data for these calculations.

Next, a third embodiment of the invention will be described.

Figure 6:
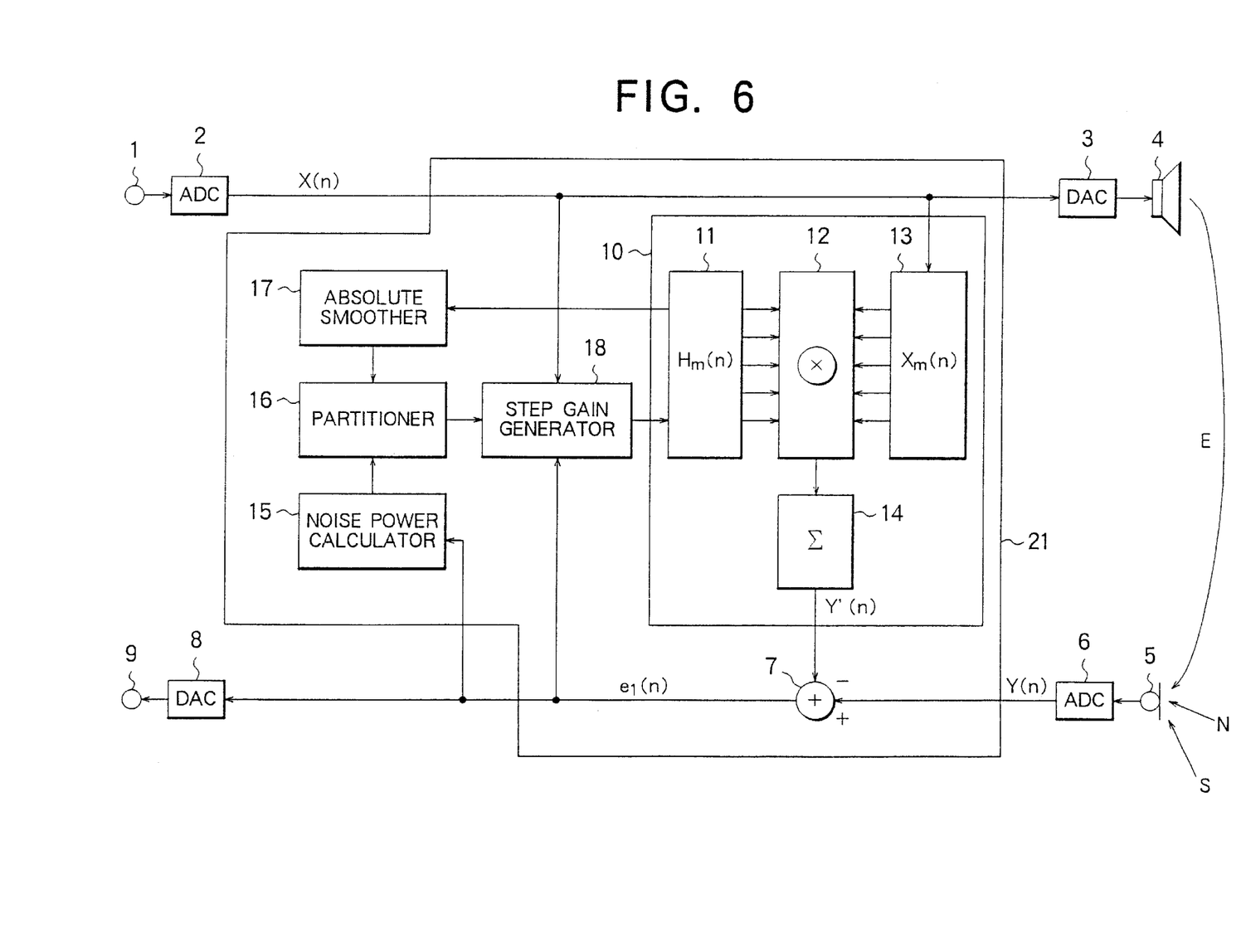
FIG. 6 is a block diagram of a third embodiment of the invention.

FIG. 6 shows the third embodiment, using the same reference numerals as in FIGS. 1 and 5 for equivalent elements. The third embodiment differs from the preceding embodiments in having no noise canceler and no noise level classifier. The first residual signal $e_1(n)$ is always supplied to the DAC 8 and step gain generator 18, and is used for all tap-coefficient adjustments.

The adaptive filter 10, noise power calculator 15, partitioner 16, absolute smoother 17, and step gain generator 18 operate as in the first embodiment. The step gain generator 18 adjusts the tap coefficients according to the equation given in the first embodiment for the case in which the first residual signal $e_1(n)$ was selected. This equation can be rewritten as follows.

$$H_m(n+1)=H_m(n)+\alpha X_m(n)e_1(n)/(\Sigma X_i(n)X_i(n))$$

$\alpha=\alpha_1$ when $1 \leq m \leq M$ $\alpha=\alpha_2$ when $M+1 \leq m \leq I$ Like the preceding embodiments, the third embodiment protects sensitive tap coefficients from local background noise effects, without relying on statistical properties of the local background noise. The third embodiment also shows that the invention can be practiced without noise cancellation.

Next, a few variations of the preceding embodiments will be described.

One variation divides the tap coefficients into more than two segments, by finding more than one boundary values and uses a different step gain for each segment.

Another variation uses an algorithm other than the NLMS algorithm to adjust the tap coefficients. Any algorithm having a step gain that determines the sensitivity of the adjustment to the residual signal can be employed.

As another variation, the noise power calculator 15 can calculate the noise power by summing squares of the residual signal values, instead of summing absolute values.

In the first embodiment, the same two step gains $\alpha_1$ and $\alpha_2$ were used to cover all three levels of local background noise, but as a variation separate step gains can be provided for each level. For example, $\alpha_1$ and $\alpha_2$ can be used at the low level, a third step gain $\alpha 3$ can be used at the high level, and a fourth step gain $\alpha 4$ and fifth step gain $\alpha 5$ can be used at the intermediate level.

The number of different local background noise levels recognized by the noise level classifier is not limited to three. The noise level classifier can classify the local background noise into only two levels (high and low), for example, or into more than three levels.

The method by which the noise level classifier classifies the local background noise level can also be varied. For example, the acoustic echo attenuation ratio ACOM can be calculated from the first residual signal $e_1(n)$ instead of-the second residual signal $e_2(n)$. ACOM can also be calculated as a power ratio instead of a magnitude ratio, or as a difference between absolute values instead of as a ratio.

As another variation, corresponding to the second aspect of the invention, the step gain can be switched on the basis of the local background noise level alone, without dividing the tap coefficients into segments. This variation can be practiced by eliminating the noise power calculator, partitioner, and absolute smoother from the first embodiment. The step gain generator uses the same step gain for all tap coefficients, but generates different step gains according to the local background noise level as detected by the noise level classifier.

Applications of the invented echo canceler are not limited to communication terminals. For example, the invention can be applied in automobile navigation equipment having a human interface that employs speech synthesis and speech recognition systems, to prevent the speech recognition system from being confused by the acoustic output of the speech synthesis system.

Those skilled in the art will recognize that further variations are possible within the scope claimed below.

What is claimed is:

1. An echo cancellation method employing an adaptive filter to generate an echo replica signal, subtracting the echo replica signal from a local input signal in which local background noise is present, thereby canceling echo, and adjusting tap coefficients of the adaptive filter according to a residual signal left after echo cancellation, using an algorithm in which a step gain determines adjustment sensitivity to the residual signal, said tap coefficients estimating an impulse response of an echo path, comprising the steps of:

partitioning said tap coefficients into at least two segments based on a relationship between said tap coefficients and a noise level, said segments being affected to different degrees by said local background noise;
   assigning at least two different step gains to respective segments, for use in adjusting the tap coefficients in said segments;
   classifying said local background into different levels; and
   selecting different step gains for assignment to said segments, corresponding to said different levels of said local background noise.

2. The method of claim 1, further comprising the steps of:
   canceling said local background noise from said residual signal; and
   choosing between using said residual signal before cancellation of said local background noise, and using said residual signal after cancellation of said local background noise, for adjusting said tap coefficients.

3. An echo canceler, having an adaptive filter that generates an echo replica signal, subtracting said echo replica signal from a local input signal in which local background noise is present, thereby canceling echo, and adjusting tap coefficients of the adaptive filter according to a residual signal left after echo cancellation, using an algorithm in which a step gain determines adjustment sensitivity to the residual signal, said tap coefficients estimating an impulse response of an echo path, comprising:

a partitioner for partitioning said tap coefficients into at least two segments based on a relationship between said tap coefficients and a noise level, said segments being affected to different degrees by said local background noise;
   a step gain generator coupled to said partitioner, for assigning at least two different step gains to respective segments, for use in adjusting the tap coefficients in said segments; and
   a noise level classifier, coupled to said step gain generator, for classifying said local background into different levels, and causing said step gain generator to select different step gains for assignment to said segments, corresponding to said different levels of said local background noise.

4. The echo canceler of claim 3, further comprising a noise canceler for canceling said local background noise from said residual signal.

5. The echo canceler of claim 4, wherein said noise level classifier further chooses between using said residual signal before cancellation of said local background noise, and using said residual signal after cancellation of said local background noise, for adjusting said tap coefficients.

* * * * *